(12) United States Patent
Hiroshima et al.

(10) Patent No.: US 12,251,915 B2
(45) Date of Patent: Mar. 18, 2025

(54) DECORATIVE SHEET

(71) Applicant: Dai Nippon Printing Co., Ltd., Tokyo (JP)

(72) Inventors: Takehiko Hiroshima, Tokyo (JP); Yoshio Okabe, Tokyo (JP); Yoshio Sukegawa, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 223 days.

(21) Appl. No.: 17/437,219

(22) PCT Filed: Mar. 14, 2019

(86) PCT No.: PCT/JP2019/010597
§ 371 (c)(1),
(2) Date: Sep. 8, 2021

(87) PCT Pub. No.: WO2020/183713
PCT Pub. Date: Sep. 17, 2020

(65) Prior Publication Data
US 2022/0048273 A1  Feb. 17, 2022

(51) Int. Cl.
*B32B 3/30* (2006.01)
*B44C 3/02* (2006.01)
*B44F 1/02* (2006.01)

(52) U.S. Cl.
CPC ............ *B32B 3/30* (2013.01); *B44C 3/02* (2013.01); *B44F 1/02* (2013.01); *B32B 2307/584* (2013.01); *B32B 2451/00* (2013.01)

(58) Field of Classification Search
CPC . B32B 3/30; B32B 2451/00; B32B 2307/584; B32B 2307/408; B32B 5/142; B32B 5/145; B44F 1/02; B44F 5/00; B44F 9/00; B44F 9/02; B44F 9/04;
(Continued)

(56) References Cited

U.S. PATENT DOCUMENTS 10,442,251 B2 * 10/2019 Murata ................ B60C 13/02
2007/0275213 A1 * 11/2007 Shimizu .............. B60R 13/02
428/141
(Continued)

FOREIGN PATENT DOCUMENTS

JP   H03-062384 U   6/1991
JP   H08-132581 A   5/1996
(Continued)

*Primary Examiner* — Alicia J Weydemeyer
*Assistant Examiner* — Laura B Figg
(74) *Attorney, Agent, or Firm* — Troutman Pepper Locke LLP

(57) ABSTRACT

Provided is a decorative sheet having excellent abrasion-resistance. Also, provided is a decorative sheet capable of reducing abrasion sound. A decorative sheet is provided with; a linear irregularity pattern formed by a plurality of groove parts arranged side by side; and a protrusion pattern that coexists inside the linear irregularity pattern, is arranged at random without having any regularity with respect to the linear irregularity pattern, and is formed to have at least a height equal to or higher than a height of a protrusion part of the linear irregularity pattern. The protrusion pattern reinforces the linear irregularity pattern.

7 Claims, 19 Drawing Sheets

(58) Field of Classification Search
CPC ..... Y10T 428/24942; Y10T 428/24479; Y10T 428/2457; B44C 3/02
See application file for complete search history.

(56) References Cited

U.S. PATENT DOCUMENTS

| | | | | |
|---|---|---|---|---|
| 2009/0260307 A1* | 10/2009 | Thiers | ........................ | B44F 9/02 |
| | | | | 52/311.1 |
| 2010/0112288 A1* | 5/2010 | Shakir | ................ | B29C 45/0001 |
| | | | | 264/293 |
| 2011/0311764 A1* | 12/2011 | Hulseman | ............... | B22F 5/007 |
| | | | | 428/141 |
| 2012/0196086 A1* | 8/2012 | Shimizu | ............. | B60R 13/0256 |
| | | | | 428/141 |
| 2015/0004335 A1* | 1/2015 | Parr | .......................... | F41H 3/00 |
| | | | | 428/141 |
| 2015/0166844 A1* | 6/2015 | Clarke | ..................... | C09J 7/203 |
| | | | | 264/293 |
| 2016/0059512 A1* | 3/2016 | Proksch | ................ | B29C 59/022 |
| | | | | 428/156 |
| 2016/0214345 A1* | 7/2016 | Kataoka | ................ | B32B 27/302 |
| 2019/0248100 A1* | 8/2019 | Horio | ...................... | B32B 9/042 |
| 2020/0353714 A1* | 11/2020 | Terada | .................... | B32B 27/08 |

FOREIGN PATENT DOCUMENTS

| | | |
|---|---|---|
| JP | H11-070797 A | 3/1999 |
| JP | H11-070800 A | 3/1999 |
| JP | 2017-053132 A | 3/2017 |
| JP | 2017-144599 A | 8/2017 |
| JP | 2018-178469 A | 11/2018 |
| JP | 2019-043086 A | 3/2019 |
| WO | 2019/066026 A1 | 4/2019 |

* cited by examiner

| Examples | 1 | 2 | 3 | 4 | 5 | 6 | 7 | 8 | 9 |
|---|---|---|---|---|---|---|---|---|---|
| Pattern A shape No. | 3 | 3 | 3 | 3 | 3 | 3 | 3 | 4 | 5 |
| Pattern B shape No. | 6 | 6 | 6 | 6 | 6 | 6 | 7 | 7 | 7 |
| Pattern A pitch d($\mu$m) | 100 | 100 | 240 | 20 | 100 | 100 | 100 | 100 | 100 |
| Pattern A depth h1($\mu$m) | 30 | 15 | 50 | 10 | 30 | 30 | 20 | 20 | 20 |
| Pattern B size s(mm$^2$) | 0.06 | 0.06 | 0.06 | 0.06 | 0.06 | 0.02 | 0.06 or more | | |
| Pattern B depth h2($\mu$m) | 20 | 20 | 20 | 20 | 80 | 20 | 20 | 20 | 20 |
| Gloss and matte effect | ◎ | ◎ | ○ | ○ | ◎ | ◎ | ◎ | ◎ | ◎ |
| Scratch resistance | ◎ | ◎ | ◎ | ◎ | ◎ | ○ | ◎ | ◎ | ◎+ |
| Unpleasant noise during scratching | ○ | ◎ | ◎ | ◎ | ◎ | ○− | ○ | ◎ | ◎ |

FIG. 11

| Comparative Examples | 1 | 2 | 3 | 4 | 5 | 6 |
|---|---|---|---|---|---|---|
| Pattern A shape No. | 3 | 3 | 3 | 3 | 3 | 3 |
| Pattern B shape No. | – | – | 6 | 6 | 6 | 6 |
| Pattern A pitch d(μm) | 100 | 240 | 300 | 20 | 100 | 100 |
| Pattern A depth h1(μm) | 30 | 50 | 50 | 4 | 30 | 30 |
| Pattern B size s(mm²) | – | – | 0.06 | 0.06 | 0.01 | 0.06 |
| Pattern B depth h2(μm) | – | – | 20 | 20 | 20 | 5 |
| Gloss and matte effect | ◎ | ○ | × | × | ◎ | ◎ |
| Scratch resistance | ×× | × | ◎ | ◎ | × | × |
| Unpleasant noise during scratching | ×× | × | ○ | ○ | × | × |

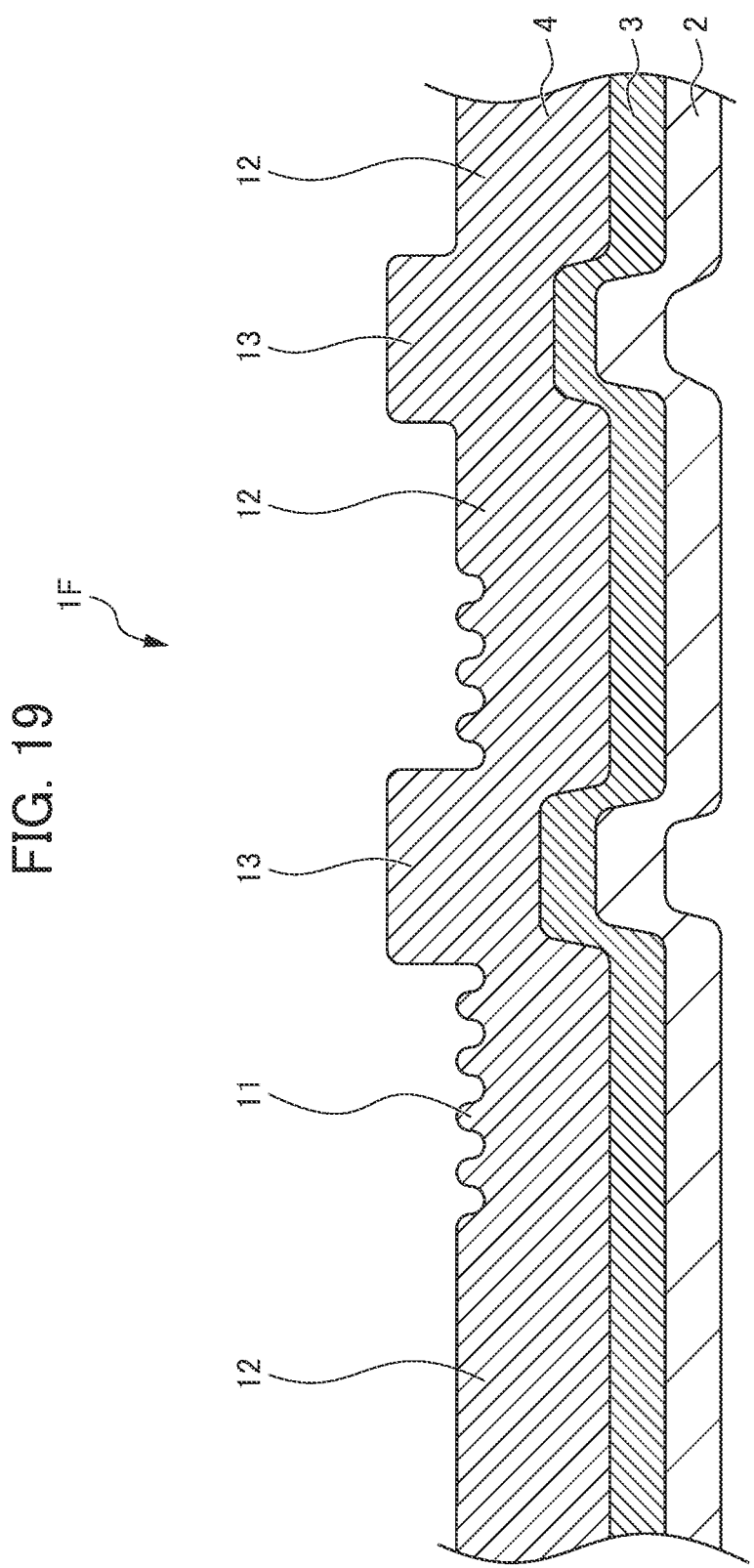

DECORATIVE SHEET

TECHNICAL FIELD

The present invention relates to a decorative sheet having a linear recess-and-protrusion pattern.

BACKGROUND ART

A decorative sheet having a surface with a linear recess-and-protrusion fine pattern is known in the conventional art (see, for example, Patent Document 1). Such a linear recess-and-protrusion fine pattern produces a gloss-lowering effect at a certain viewing angle when it is a collection of linear recesses and protrusions parallel to one another. A combination of multiple collections of linear recesses and protrusions with an adjusted thickness of each linear pattern can produce multiple differences in gloss, and also can provide a dynamic design, which changes the difference in gloss with the viewing angle, when each of the collections of linear recesses and protrusions has a different linear direction. A sheet with such a linear recess-and-protrusion fine pattern needs to have increased scratch resistance at its recess-and-protrusion portion. This is because, when scratched with force, the linear recess-and-protrusion pattern portion may collapse and change in appearance. In order to improve the scratch resistance, for example, the linear recess-and-protrusion pattern may be made thick. However, if it is made so thick that the scratch resistance is kept at a practical level, the gloss-lowering effect will be low or the linear recesses and protrusions will be clearly visible, so that the realistic design appearance may degrade.

Moreover, a decorative sheet having a linear recess-and-protrusion fine pattern sometimes produces unpleasant frictional noise even when the linear recess-and-protrusion pattern portion is scratched with such a force that it remains uncollapsed. A need also exists to reduce such frictional noise.

Patent Document 1: Japanese Unexamined Utility Model Application, Publication No. H03-62384

DISCLOSURE OF THE INVENTION

Problems to be Solved by the Invention

It is an object of the present invention to provide a decorative sheet having good scratch resistance. It is another object of the present invention to provide a decorative sheet capable of producing less frictional noise.

Means for Solving the Problems

The present invention provides the following solutions to the problems. In order to facilitate understanding, ordinal numbers are assigned to embodiments of the present invention to be described, but such numbering should not be interpreted as limitation.

A first aspect of the invention is directed to a decorative sheet (1, 1B, 1C, 1D) including: a linear recess-and-protrusion pattern portion (11) having multiple grooves arranged side by side; and protrusion pattern portions (13) that are located in the linear recess-and-protrusion pattern portion (11) and randomly arranged with no regularity with respect to the linear recess-and-protrusion pattern portion (11) in plan view in a direction normal to the sheet surface, the protrusion pattern portions (13) protruding at least to a height equal to or greater than the height of the protrusion of the linear recess-and-protrusion pattern portion (11).

A second aspect of the invention is directed to the decorative sheet (1, 1B, 1C, 1D) according to the first aspect of the invention, wherein the linear recess-and-protrusion pattern portion (11) has the grooves arranged at pitches of 240 µm or less, and the protrusion pattern portions (13) each have an area of 0.02 mm$^2$ or more.

A third aspect of the invention is directed to the decorative sheet (1, 1B, 1C, 1D) according to the first or second aspect of the invention, wherein the linear recess-and-protrusion pattern portion (11) has protrusions with a height of 5 µm or more.

A fourth aspect of the invention is directed to the decorative sheet (1, 1B, 1C, 1D) according to any one of the first to third aspects of the invention, wherein the protrusion pattern portions (13) each have a height of 20 µm or more.

A fifth aspect of the invention is directed to the decorative sheet (1, 1B, 1C, 1D) according to any one of the first to fourth aspects of the invention, wherein the linear recess-and-protrusion pattern portion (11) is segmented into closed regions, and the closed regions include adjacent closed regions different in the form of the groove.

A sixth aspect of the invention is directed to the decorative sheet (1, 1B, 1C, 1D) according to any one of the first to fifth aspects of the invention, further including a smooth pattern portion (12) that is further located in the linear recess-and-protrusion pattern portion (11), has a pattern different from that of the linear recess-and-protrusion pattern portion (11) and that of the protrusion pattern portions (13), and has a smooth surface, wherein the protrusion pattern portions (13) each have a height equal to or greater than the height of the smooth pattern portion (12).

A seventh aspect of the invention is directed to the decorative sheet (1, 1B, 1C, 1D) according to any one of the first to sixth aspects of the invention, comprising a base material (2), a patterned layer (3) provided on the base material (2), and a resin layer (4) provided on the patterned layer (3), wherein the linear recess-and-protrusion pattern portion (11) and the protrusion pattern portions (13) are molded in the resin layer (4).

Effects of the Invention

The present invention makes it possible to provide a decorative sheet having good scratch resistance. The present invention also makes it possible to provide a decorative sheet capable of producing less frictional noise.

BRIEF DESCRIPTION OF THE DRAWINGS

FIG. 10 is a diagram collectively showing what combinations produced good results, specifically, collectively showing the results of examination of examples according to the present invention;

FIG. 11 is a diagram collectively showing what combinations failed to produce good results, specifically, collectively showing the results of examination of comparative examples;

FIG. 19 is a view showing an example of a decorative sheet also having a recess-and-protrusion pattern on its bottom side.

PREFERRED MODE FOR CARRYING OUT THE INVENTION

Hereinafter, the best mode for carrying out the present invention will be described with reference to the drawings.

First Embodiment

Figure 1:
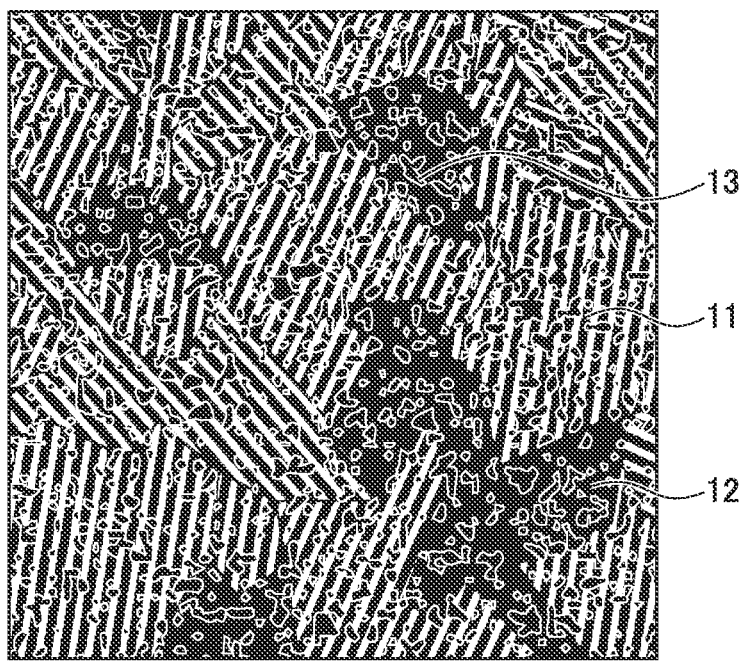
FIG. 1 is a plan view showing a decorative sheet 1 according to a first embodiment of the present invention.
Figure 2:
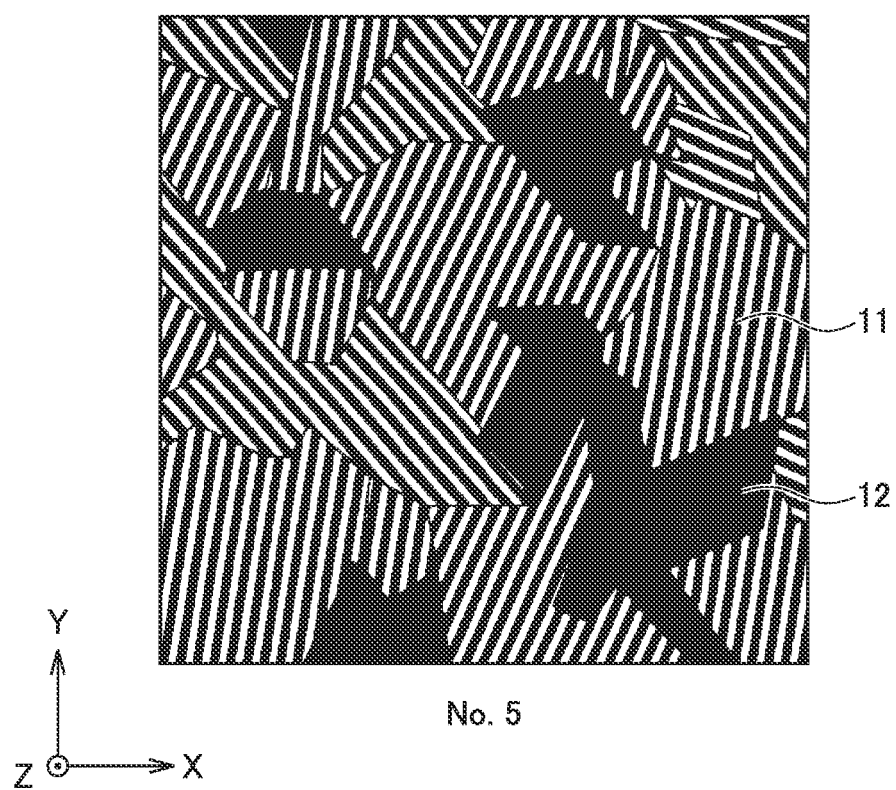
FIG. 2 is a view showing only a linear recess-and-protrusion pattern portion 11 and a smooth pattern portion 12, excluding protrusion pattern portions 13, among those shown in FIG. 1.
Figure 3:
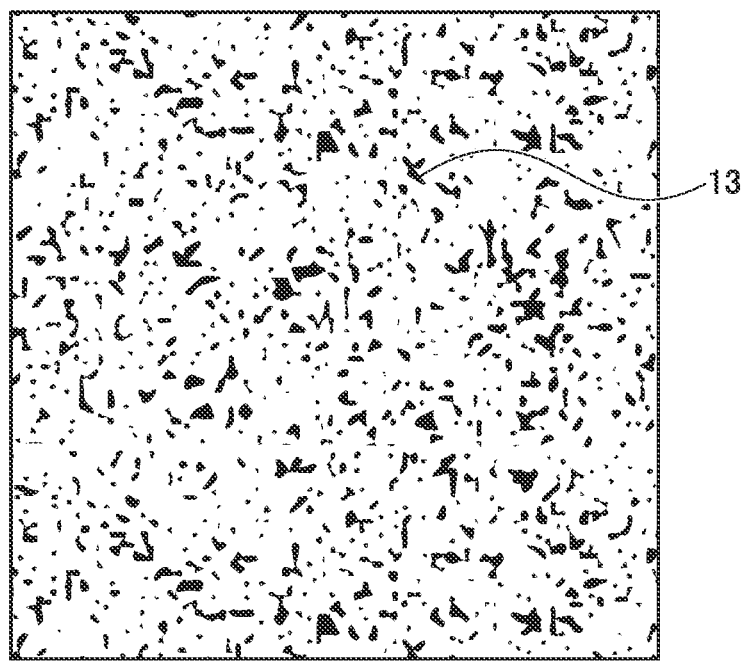
FIG. 3 is a plan view showing only protrusion pattern portions 13.
Figure 4:
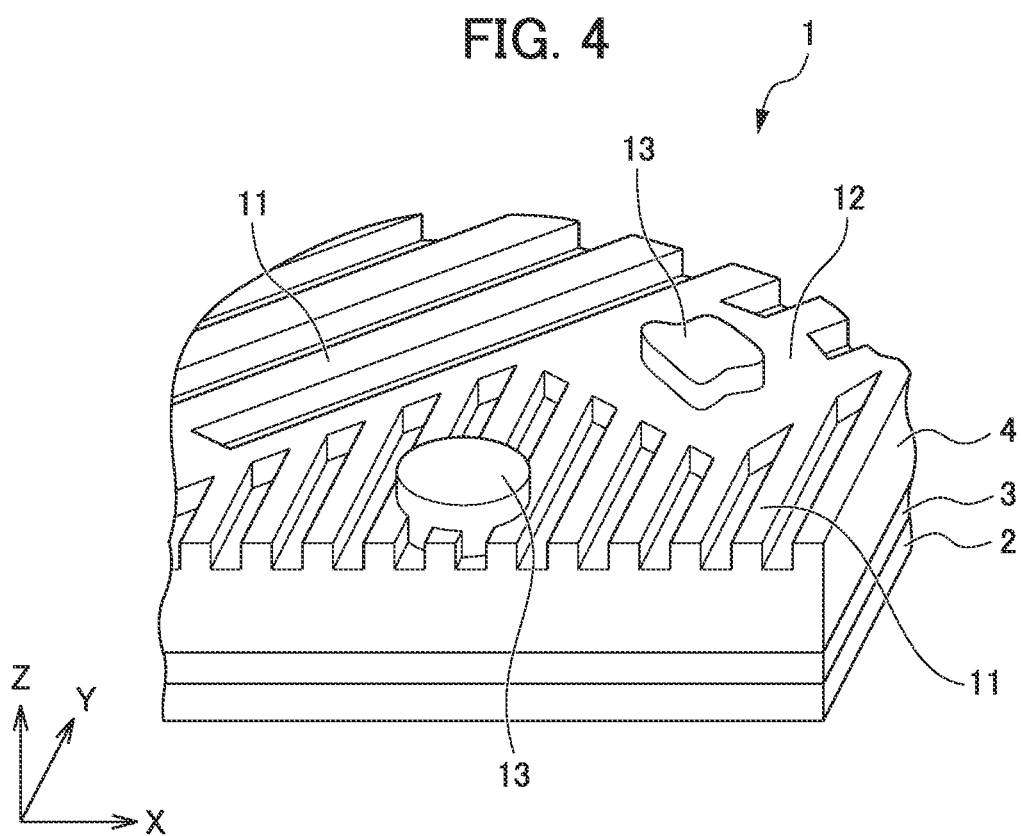
FIG. 4 is a perspective view showing a portion of the decorative sheet 1 in an enlarged manner.
Figure 5:
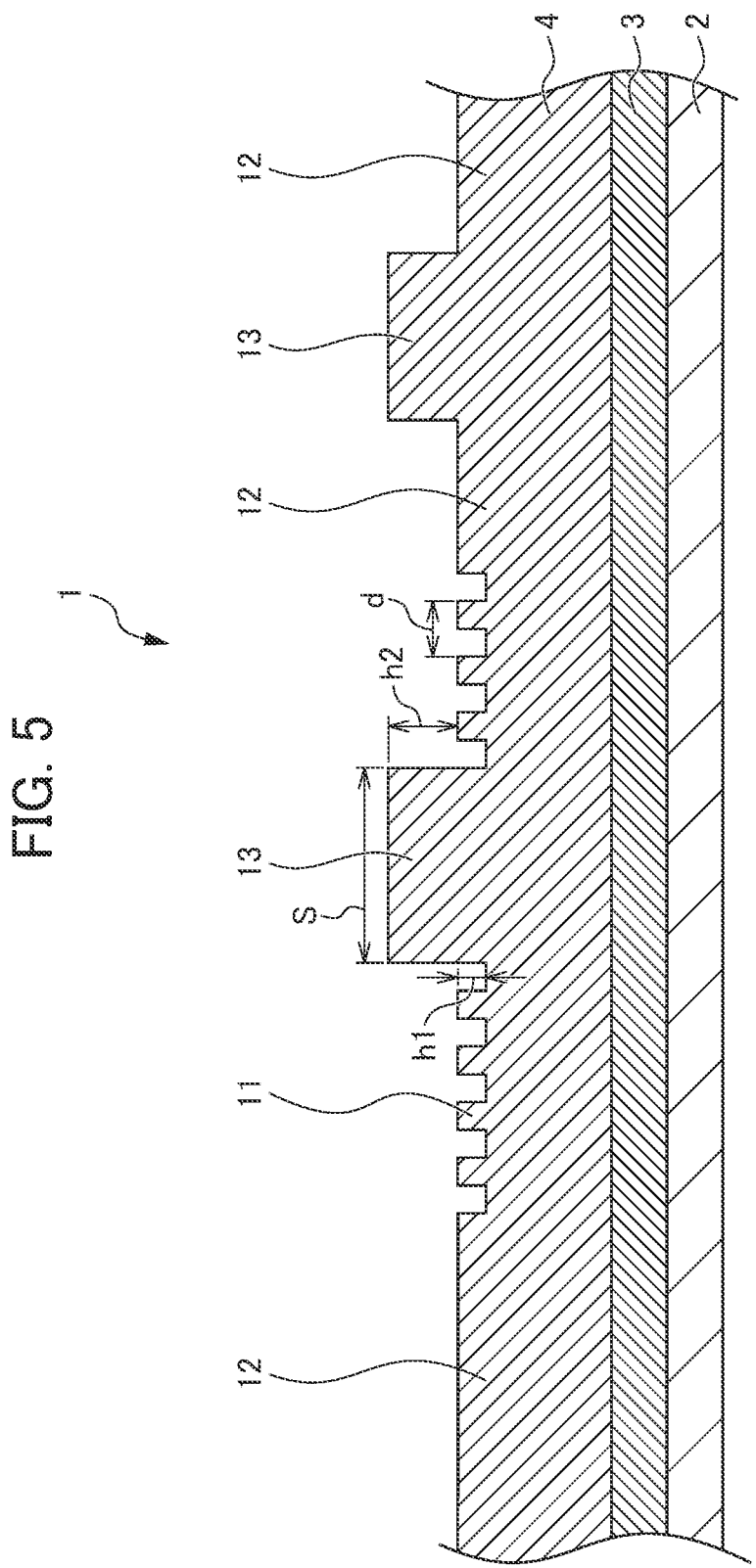
FIG. 5 is a cross-sectional view of the decorative sheet 1 along a cutting plane perpendicular to the sheet surface.

FIG. 1 is a plan view showing a decorative sheet 1 according to a first embodiment of the present invention. FIG. 2 is a view showing only a linear recess-and-protrusion pattern portion 11 and a smooth pattern portion 12, excluding protrusion pattern portions 13, among those shown in FIG. 1. FIG. 3 is a plan view showing only protrusion pattern portions 13. FIG. 4 is a perspective view showing a portion of the decorative sheet 1 in an enlarged manner. FIG. 5 is a cross-sectional view of the decorative sheet 1 along a cutting plane perpendicular to the sheet surface. The decorative sheet 1 according to the first embodiment includes a base material 2, a patterned layer 3, and a resin layer 4.

It should be noted that the drawings referred to below including FIGS. 1 to 5 are schematic and the size and shape of each component shown therein are exaggerated as needed to facilitate understanding. While specific values, shapes, materials, and other features will be shown in the description below, they may be altered or modified as needed. Terms used herein to specify shapes or geometric conditions, such as "parallel" and "perpendicular", have not only the exact meaning but also other meaning equivalent in optical function and including errors to such an extent that it is not considered to depart from the exact meaning, such as "parallel" or "perpendicular". As used herein, the term "sheet" has a meaning according to general usage in which "plate", "sheet", and "film" are used in the order of decreasing thickness. However, such usage has no technical significance, and these terms may be interchangeably used as needed. As used herein, the term "sheet surface" is intended to mean the surface that is oriented in the plane direction of the sheet when the sheet is viewed as a whole. For example, referring to FIGS. 1, 2, and 4 shown with the XYZ coordinate system, the "sheet surface" corresponds to the XY plane or a plane parallel to the XY plane in each drawing.

The base material 2 is made of, for example, polyvinyl chloride resin with a thickness of 300 μm. Besides polyvinyl chloride resin, the base material 2 may also include, for example, polyolefin resin, such as polyethylene, polypropylene, polymethylpentene, polybutene, or olefin-based thermoplastic elastomer; polyester resin, such as polyethylene terephthalate, polybutylene terephthalate, polyethylene naphthalate, terephthalic acid-isophthalic acid-ethylene glycol copolymer, terephthalic acid-ethylene glycol-1,4 cyclohexanedimethanol copolymer, or thermoplastic polyester elastomer; polyamide resin, such as nylon 6, nylon 9, or nylon 6,6; polyimide resin; fluororesin, such as polyvinyl fluoride, polyvinylidene fluoride, polyvinylidene trifluoride, ethylene-ethylene tetrafluoride copolymer, or polyethylene tetrafluoride; acrylic resin, polystyrene, polycarbonate resin, ethylene-propylene copolymer, ethylene-vinyl acetate copolymer, ethylene-acrylic acid copolymer, ethylene-propylene-butene copolymer, or thermoplastic polyolefin elastomer. The acrylic resin may be, for example, one of or a mixture of two or more of polymethyl (meth)acrylate, polyethyl (meth)acrylate, polybutyl (meth)acrylate, methyl (meth)acrylate-butyl (meth)acrylate copolymer, ethyl (meth)acrylate-butyl (meth)acrylate copolymer, and methyl (meth)acrylate-styrene copolymer, wherein the term "(meth)acrylate" means acrylate or methacrylate. The base material may also be paper or a woven or nonwoven fabric of various fibers having an appearance and properties similar to those of paper. The various fibers may include inorganic fibers, such as glass fibers, asbestos fibers, potassium titanate fibers, alumina fibers, silica fibers, or carbon fibers, or synthetic resin fibers, such as polyester fibers, acrylic fibers, or vinylon fibers.

The patterned layer 3 is a layer having a pattern provided on one surface of the base material 2. The patterned layer 3 can be formed, for example, by direct printing on the base material 2. Besides printing, the patterned layer 3 may be formed by transfer or the like. In this embodiment, the patterned layer 3 has a pattern that mimics the appearance of a cut or cleaved surface of a granite material, which includes different mineral single crystals arranged in the surface.

The resin layer 4 is provided on the patterned layer 3 and made of, for example, polyvinyl chloride resin. Besides polyvinyl chloride resin, the resin layer 4 may also include, for example, polyolefin resin, such as polyethylene, polypropylene, polymethylpentene, polybutene, or olefin-based thermoplastic elastomer; polyester resin, such as polyethylene terephthalate, polybutylene terephthalate, polyethylene naphthalate, terephthalic acid-isophthalic acid-ethylene glycol copolymer, terephthalic acid-ethylene glycol-1,4 cyclohexanedimethanol copolymer, or thermoplastic polyester elastomer; polyamide resin, such as nylon 6, nylon 9, or nylon 6,6; polyimide resin; fluororesin, such as polyvinyl fluoride, polyvinylidene fluoride, polyvinylidene trifluoride, ethylene-ethylene tetrafluoride copolymer, or polyethylene tetrafluoride; acrylic resin, polystyrene, polycarbonate resin, ethylene-propylene copolymer, ethylene-vinyl acetate copolymer, ethylene-acrylic acid copolymer, ethylene-propylene-butene copolymer, or thermoplastic polyolefin elastomer.

The resin layer 4 includes transparent or translucent resin, which allows the pattern of the patterned layer 3 to be seen through the resin layer 4.

In the decorative sheet 1 according to this embodiment, the base material 2, the patterned layer 3, and the resin layer 4 have a total thickness of, for example, about 20 µm to about 1,000 µm.

In this embodiment, the resin layer 4 has a surface with a large number of recess and protrusion geometries. The recess and protrusion geometries may be broadly classified into three pattern portions: a linear recess-and-protrusion pattern portion 11, a smooth pattern portion 12, and a protrusion pattern portion 13.

As shown in FIGS. 1, 2, and 4, the linear recess-and-protrusion pattern portion 11 has multiple grooves arranged side by side, which have a group of parallel straight lines in plan view, and has a plan view shape (defined later) including a group of parallel straight lines. In this embodiment, the linear recess-and-protrusion pattern portion 11 has a large number of linear grooves arranged side by side. Moreover, the linear recess-and-protrusion pattern portion 11 is segmented into closed regions, which include adjacent closed regions different in the form of grooves. Specifically, one closed region has a certain groove extending direction, a certain depth, a certain protrusion width, and a certain groove width, while another closed region adjacent to the one closed region has a groove extending direction, a depth, a protrusion width, and a groove width, at least one of which differs from that of the one closed region. Therefore, each of the closed regions has a different appearance design. Furthermore, the area having the linear recess-and-protrusion pattern portion 11 basically has a matte appearance with low gloss although it depends on the illumination light incident angle and the line-of-sight angle.

The smooth pattern portion 12 is located in the linear recess-and-protrusion pattern portion 11 and has a pattern different from those of the linear recess-and-protrusion pattern portion 11 and the protrusion pattern portion 13. The smooth pattern portion 12 has a smooth surface. In this embodiment, the smooth pattern portion 12 has a height equal to the height of the protrusions of the linear recess-and-protrusion pattern portion 11. The smooth pattern portion 12 has a smooth surface and has a somewhat wide area as compared to the area of the protrusion of the linear recess-and-protrusion pattern portion 11. Therefore, the smooth pattern portion 12 appears shiny by reflecting light although it depends on the viewing angle. A combination of the smooth pattern portion 12 and the linear recess-and-protrusion pattern portion 11 can provide what is called a gloss and matte appearance. The term "gross and matte appearance" refers to a design appearance that is advantageously used to mimic the appearance of, for example, a cut (or cleaved) surface of a granite material, which is a mixture of mineral single crystal regions having a specific composition and having glossy faces with high gloss and matte faces with low gloss, which appear depending on the combination of the illumination light incident angle and the line-of-sight angle. In this regard, the gloss (or matte) of each of the single crystal regions will change with changing observation conditions depending on the combination of the illumination light incident angle and the line-of-sight angle, and the appearance of the same region will change from glossy to matte or matte to glossy depending on the observation conditions.

The protrusion pattern portions 13 are located in the linear recess-and-protrusion pattern portion 11 and randomly arranged with no regularity with respect to the linear recess-and-protrusion pattern portion 11. The protrusion pattern portions 13 each have a height equal to or greater than the height of the protrusions of the linear recess-and-protrusion pattern portion 11. As shown in FIG. 3, the protrusion pattern portions 13 are randomly arranged to provide a pearskin-like very fine texture as compared to one closed region of the linear recess-and-protrusion pattern portion 11 and one closed region of the smooth pattern portion 12. Alternatively, a specific mode of the protrusion pattern portions 13 may have a pattern slightly larger than that shown in FIG. 3 (see FIG. 9 referred to later). In this regard, the expression "protrusion pattern portions 13 randomly arranged" means that all protrusion pattern portions 13 are arranged such that they neither have plan view shapes congruent to one another nor are arranged at regular pitches in a plane in plan view in the direction normal to the surface of the decorative sheet. All the protrusion pattern portions 13 on the decorative sheet 1 preferably have two or more patterns different in plan view shape, and the protrusion pattern portions 13 adjacent to one another are preferably arranged at two or more different intervals (pitches) along a plane. More preferably, all the protrusion pattern portions 13 on the decorative sheet 1 have different plan view shapes, and each pair of protrusion pattern portions 13 arranged adjacent to each other are spaced at a different interval. The term "plan view" regarding the decorative sheet, each of the pattern portions 11, 12, and 13 on the decorative sheet, and the patterned layer 13 will be explained with reference to FIGS. 1, 2, and 4 shown with the XYZ coordinate system. The sheet surface corresponds to the XY plane or a plane parallel to the XY plane in each drawing, and the direction normal to the sheet surface corresponds to the Z axis direction. Therefore, the "plan view" correspond to the appearance of each decorative sheet, each of the pattern portions 11, 12, and 13, and the patterned layer 3 as viewed in the Z axis direction. In this regard, FIG. 1 itself shows the plan view appearance of the decorative sheet 1.

Figure 6:
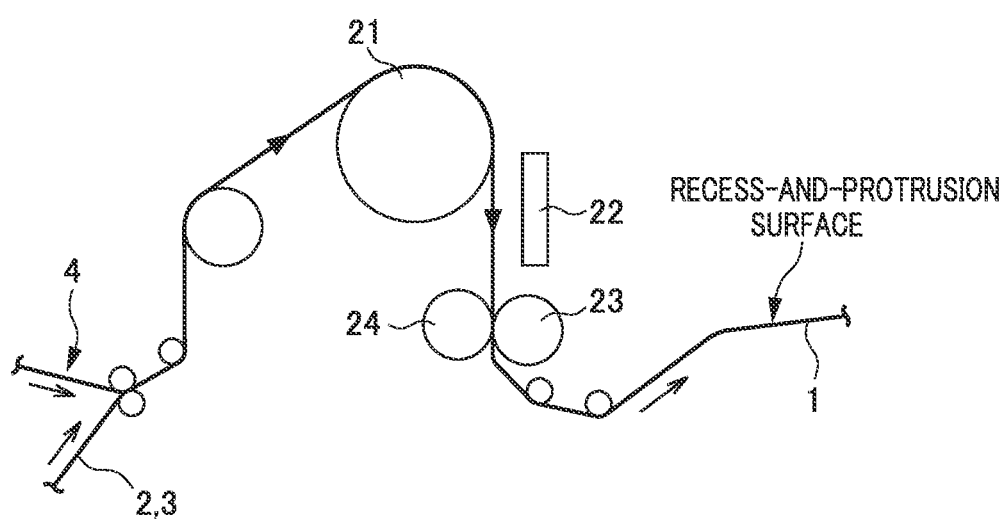
FIG. 6 is a diagram showing a process of producing the decorative sheet 1.

The decorative sheet 1 according to this embodiment may be produced by a process that includes providing a mold having a shape reverse to that of the decorative sheet 1; and performing molding using the mold. The decorative sheet 1 may be produced using a prepared mold. FIG. 6 is a diagram for illustrating a process of producing the decorative sheet 1. A sheet is provided including a belt-shaped base material 2 and a patterned layer 3 printed on the base material 2. The sheet and a polyvinyl chloride resin sheet for forming a resin layer 4, which is placed on the patterned layer 3 side of the sheet, are fed overlapping each other. The temperature is adjusted on a large diameter roller 21 and further adjusted by a heater 22 so that the resin layer 4 is softened while they are fed to between a die roller 24 and a mold roller 23. While passing between the die roller 24 and the mold roller 23, the base material 2, the patterned layer 3, and the resin layer 4 are laminated, and recess-and-protrusion patterns are molded on the resin layer 4, so that the decorative sheet 1 is completed.

Figure 7:
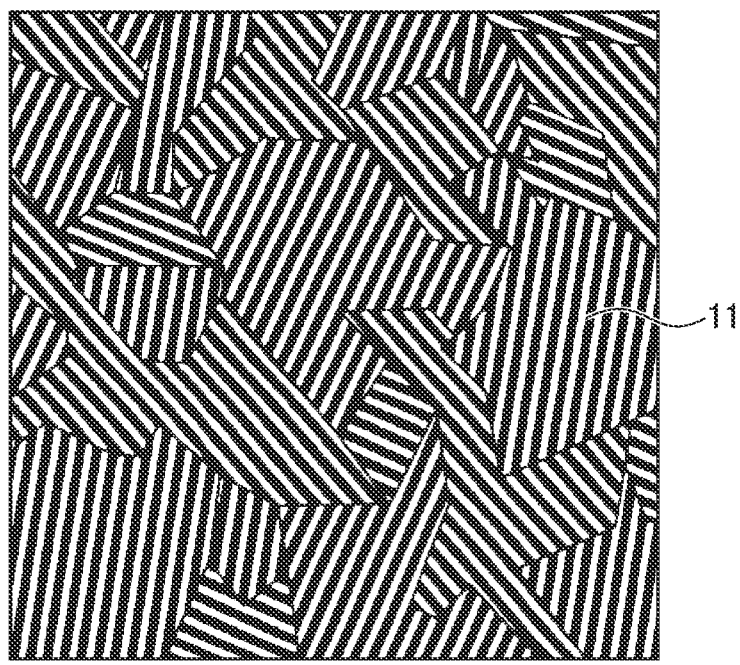
FIG. 7 is a plan view showing pattern No. 3 added for examination.
Figure 8:
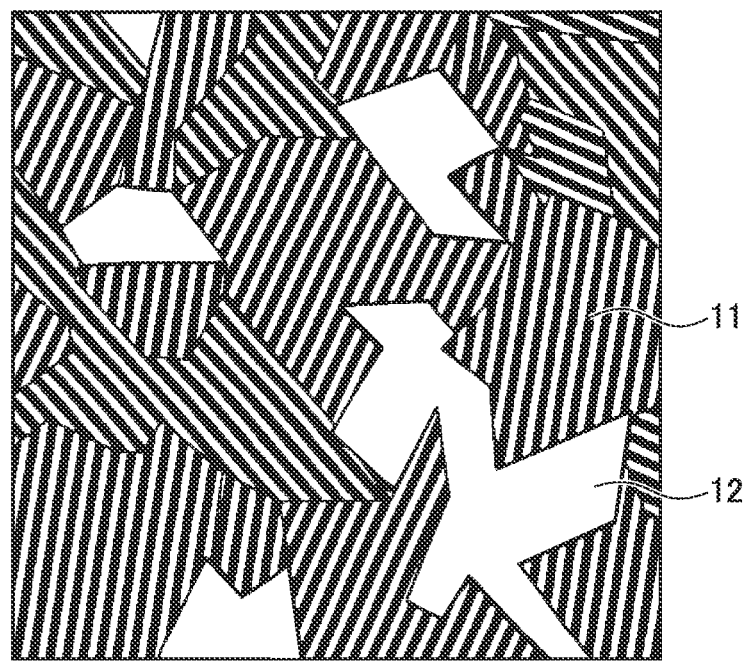
FIG. 8 is a plan view showing pattern No. 4 added for examination.
Figure 9:
FIG. 9 is a plan view showing pattern No. 7 added for examination.

Next, preferred ranges of the dimensions of each portion of the decorative sheet 1 will be described. In this regard, decorative sheets were prepared with a combination of multiple patterns for the purpose of examining scratch resistance and frictional noise with respect to a combination of multiple decorative sheets. FIG. 7 is a plan view showing pattern No. 3 added for the examination. Pattern No. 3 is a modification of pattern No. 5 shown in FIG. 2 and also includes a linear recess-and-protrusion pattern portion 11 instead of the smooth pattern portion 12 of pattern No. 5. FIG. 8 is a plan view showing pattern No. 4 added for the examination. Pattern No. 4 is a modification of pattern No. 5 shown in FIG. 2 and includes a portion having a smooth surface and having a level equal to that of the grooves of the linear recess-and-protrusion pattern portion 11, instead of the smooth pattern portion 12 of pattern No. 5. FIG. 9 is a plan view showing pattern No. 7 added for the examination. Pattern No. 7 is a modification of pattern No. 6 shown in FIG. 3 and includes regions that are arranged in a random pattern as in pattern No. 6 but each have an area larger than that in pattern No. 6. To facilitate explanation and understanding, patterns Nos. 3, 4, and 5 are collectively referred to as patterns A, and pattern Nos. 6 and 7 are collectively referred to as patterns B. Patterns B correspond to the protrusion pattern portions 13. Any one of patterns A was combined with any one of patterns B. Besides the combination of patterns, patterns A were provided with different pitches and different heights, and patterns B were provided with different sizes (areas) and different heights.

Combinations that provide good results and specifically the results of the examination of examples according to the present invention are summarized in FIG. 10. Combinations that fail to provide good results and specifically the results of the examination of comparative examples are summarized in FIG. 11. Regarding the results of the examination shown in FIGS. 10 and 11, the evaluation of the gloss and matte effect was performed by visually observing the presence or absence of the gloss-lowering effect before and after the molding of the recess-and-protrusion pattern. The evaluation in a scratch resistance test was performed by scratching the surface with the nail 10 times in a reciprocating manner and then visually observing the presence or absence of a change in gloss on the scratched surface. The evaluation of unpleasant noise during the scratching was performed by checking the presence or absence of high-frequency frictional noise during the scratching with the nail. Regarding the results of the evaluation shown in FIGS. 10 and 11, the bullseye symbol ⊙ and the circle symbol ○ indicate good results at acceptable levels, in which the former indicates a result better than that indicated by the latter. The double cross symbol xx and the cross symbol x indicate poor results at unacceptable levels, in which the former indicates a result worse than that indicated by the latter. Moreover, the symbol + or − indicate that the result is slightly better or worse than indicated by the corresponding symbol.

The results in FIGS. 10 and 11 show the following. Regarding patterns A, when the pitch d is equal to or greater than 300 μm (d≥300 μm), the parallel line group pattern is so thick as to be clearly visible and cannot provide a practically realistic design appearance (resulting in a fake appearance). See Example 3 and Comparative Example 3. Regarding patterns A, when the height h1 is equal to or less than 5 μm (h1≤5 μm), the gloss-lowering effect cannot be obtained, and the resulting gloss is at the same level as that obtained with a pattern having no parallel line group. See Example 4 and Comparative Example 4. Regarding patterns B, when the size s is equal to or less than 0.01 mm² (s≤0.01 mm²), the added area is not enough to keep the pattern A portion scratch-resistant, and the scratch resistance is degraded. See Example 6 and Comparative Example 5. Regarding patterns B, when the height h2 is equal to or less than 20 μm (h2≤20 μm), the added recesses and protrusions are not enough to keep the pattern A portion scratch-resistant, and the scratch resistance is degraded. Regarding patterns A, the scratch resistance is better when the flat portion is located at an uppermost position (pattern No. 5) than when the flat portion is located at a lowermost position (pattern No. 4). Regrading patterns B, there is no difference in performance between a pearskin-like texture (pattern No. 6) and a random texture (pattern No. 7).

In view of the results shown above, the linear recess-and-protrusion pattern portion 11 preferably has grooves arranged at pitches of 240 μm or less. The protrusion pattern portions 13 each preferably have an area of 0.02 mm² or more. Regarding patterns A, the height is preferably 5 μm or more. The protrusion pattern portions 13 each preferably have a height of 20 μm or more.

Moreover, patterns B (protrusion pattern portions 13) are expected to be effective in preventing damage by scratching, for example, which would otherwise occur if the user scratches the linear recess-and-protrusion pattern portion 11 when touching by hand. The space between each pair of protrusion pattern portions 13 is an important feature for effectively preventing the damage to the linear recess-and-protrusion pattern portion 11. If the space between the protrusion pattern portions 13 is too wide, the user may fail to touch the protrusion pattern portion 13 with a finger or the like and more easily touch the linear recess-and-protrusion pattern portion 11. Even in view of such a problem, if the protrusion pattern portions 13 are too densely arranged, the intended beautiful design may fail to be provided. Since the individual protrusion pattern portions 13 are randomly arranged, there may be a variety of intervals between them. When a certain protrusion is selected from the protrusion pattern portions 13, the distance between the protrusion and another protrusion closest to the protrusion may be called a shortest distance. There are many shortest distances, among which the maximum one may be called the maximum shortest distance. The maximum shortest distance may be set in an appropriate range so that the protrusion pattern portions 13 can be arranged at an appropriate density, which is not too low and not too high. When the main purpose is to prevent touching by hand from causing damage, for example, the maximum shortest distance may be set in the range of 2 mm or more and 10 mm or less.

As described above, according to this embodiment, the protrusion pattern portions 13 are provided to appropriately reinforce the decorative sheet without degrading the function of the linear recess-and-protrusion pattern portion 11. This embodiment also makes it possible to provide a beautiful design with no adverse effect on the intended gloss and matte appearance.

Second Embodiment

Figure 12:
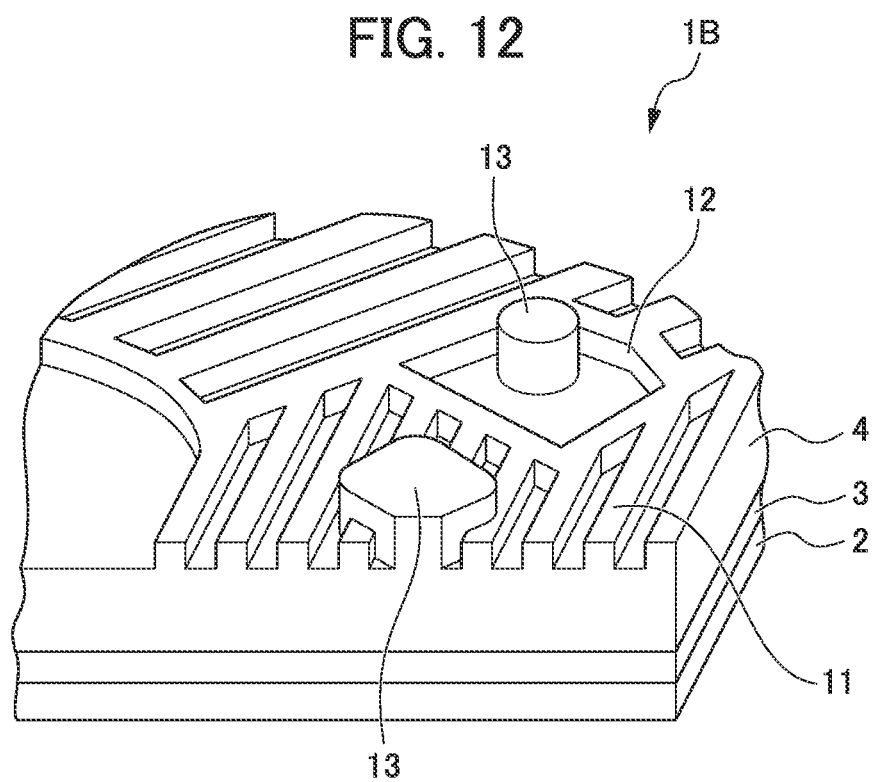
FIG. 12 is a perspective view showing, in an enlarged manner, a portion of a decorative sheet 1B according to a second embodiment of the present invention.
Figure 13:
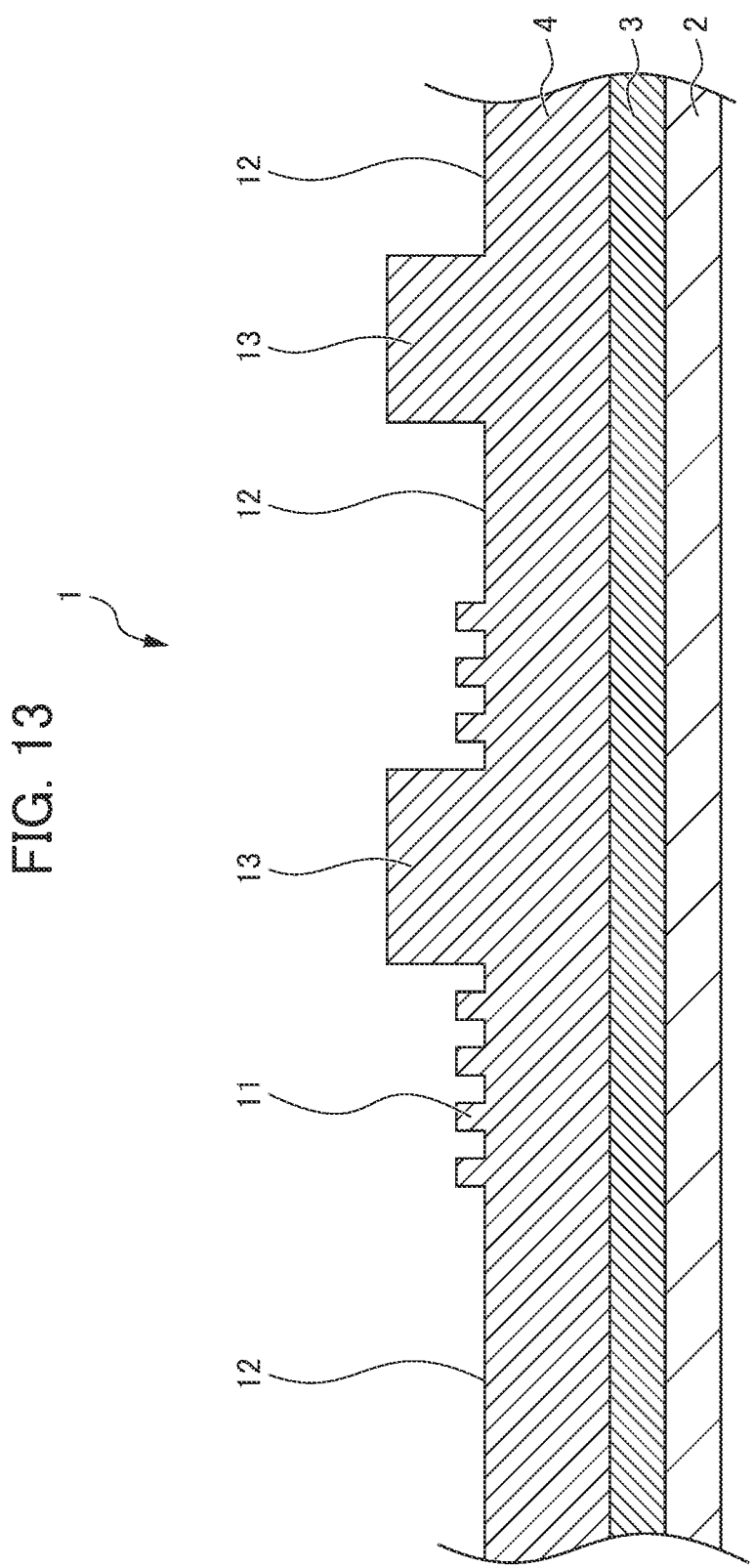
FIG. 13 is a cross-sectional view of the decorative sheet 1B along a cutting plane perpendicular to the sheet surface.

FIG. 12 is a perspective view showing, in an enlarged manner, a portion of a decorative sheet 1B according to a second embodiment of the present invention. FIG. 13 is a cross-sectional view of the decorative sheet 1B along a cutting plane perpendicular to the sheet surface. In the first embodiment, the smooth pattern portion 12 has a height equal to the height of the protrusions of the linear recess-and-protrusion pattern portion 11. On the other hand, in the decorative sheet 1B according to the second embodiment, the level of the smooth pattern portion 12 is the same as the level of the bottom surface of the grooves of the linear recess-and-protrusion pattern portion 11. Even when the decorative sheet is configured in this manner, the protrusion pattern portions 13 are sufficiently effective in reinforcing the linear recess-and-protrusion pattern portion 11.

Third Embodiment

Figure 14:
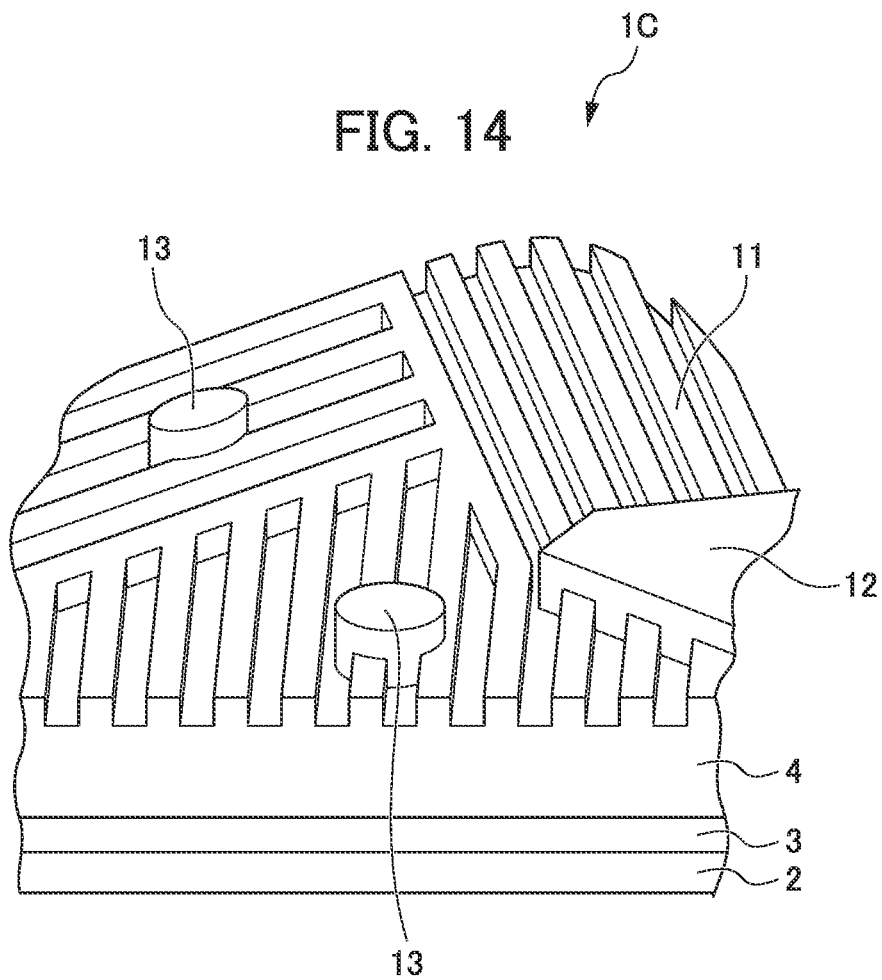
FIG. 14 is a perspective view showing, in an enlarged manner, a portion of a decorative sheet 1C according to a third embodiment of the present invention.
Figure 15:
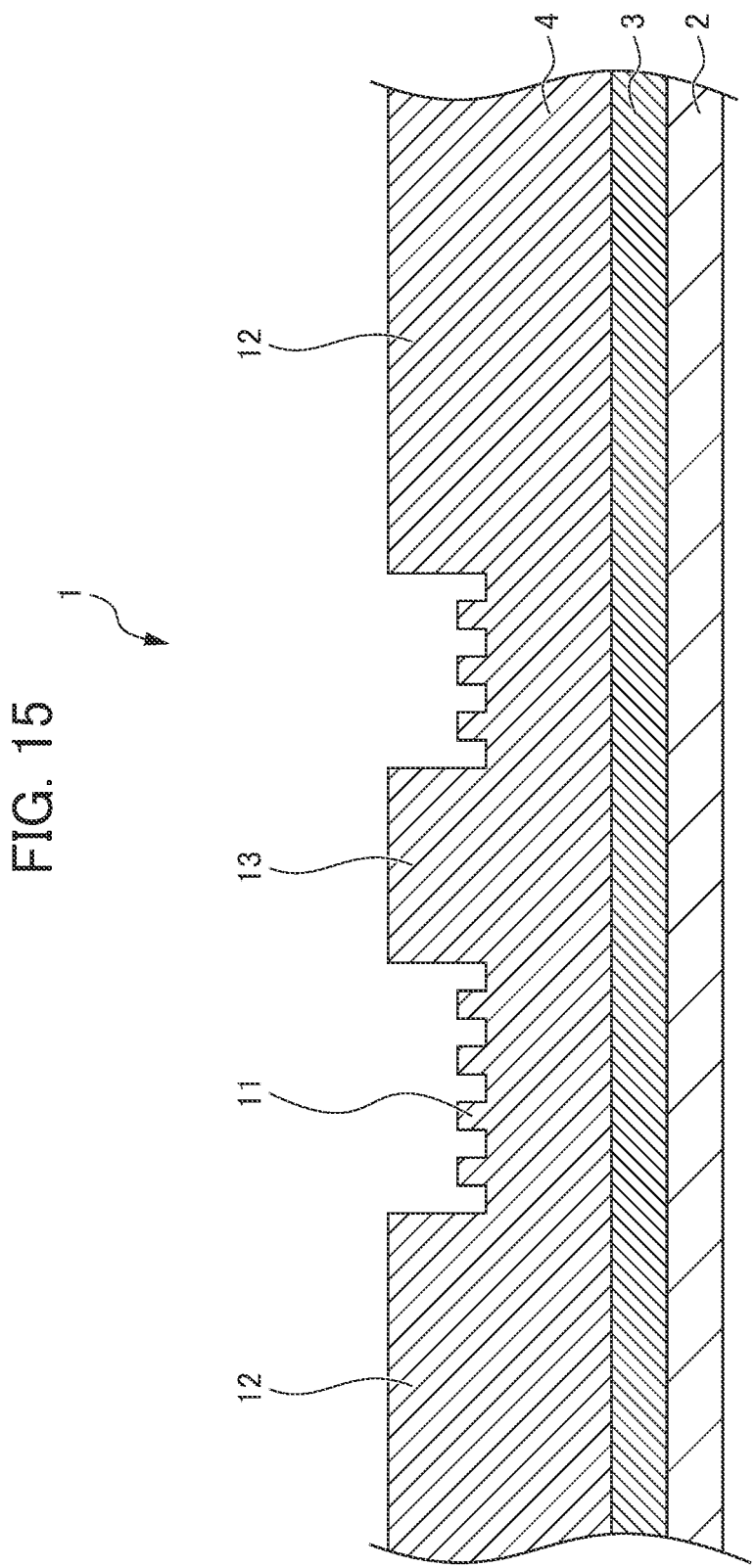
FIG. 15 is a cross-sectional view of the decorative sheet 1C along a cutting plane perpendicular to the sheet surface.

FIG. 14 is a perspective view showing, in an enlarged manner, a portion of a decorative sheet 1C according to a third embodiment of the present invention. FIG. 15 is a cross-sectional view of the decorative sheet 1C along a cutting plane perpendicular to the sheet surface. In the first embodiment, the smooth pattern portion 12 has a height equal to the height of the protrusions of the linear recess-and-protrusion pattern portion 11. On the other hand, in the decorative sheet 1C according to the third embodiment, the smooth pattern portion 12 has a height greater than the height of the protrusions of the linear recess-and-protrusion pattern portion 11. Moreover, in the decorative sheet 1C according to the third embodiment, the protrusion pattern portions 13 have a height equal to the height of the smooth pattern portion 12. Even when the decorative sheet is configured in this manner, the protrusion pattern portions 13 are sufficiently effective in reinforcing the linear recess-and-protrusion pattern portion 11.

Fourth Embodiment

Figure 16:
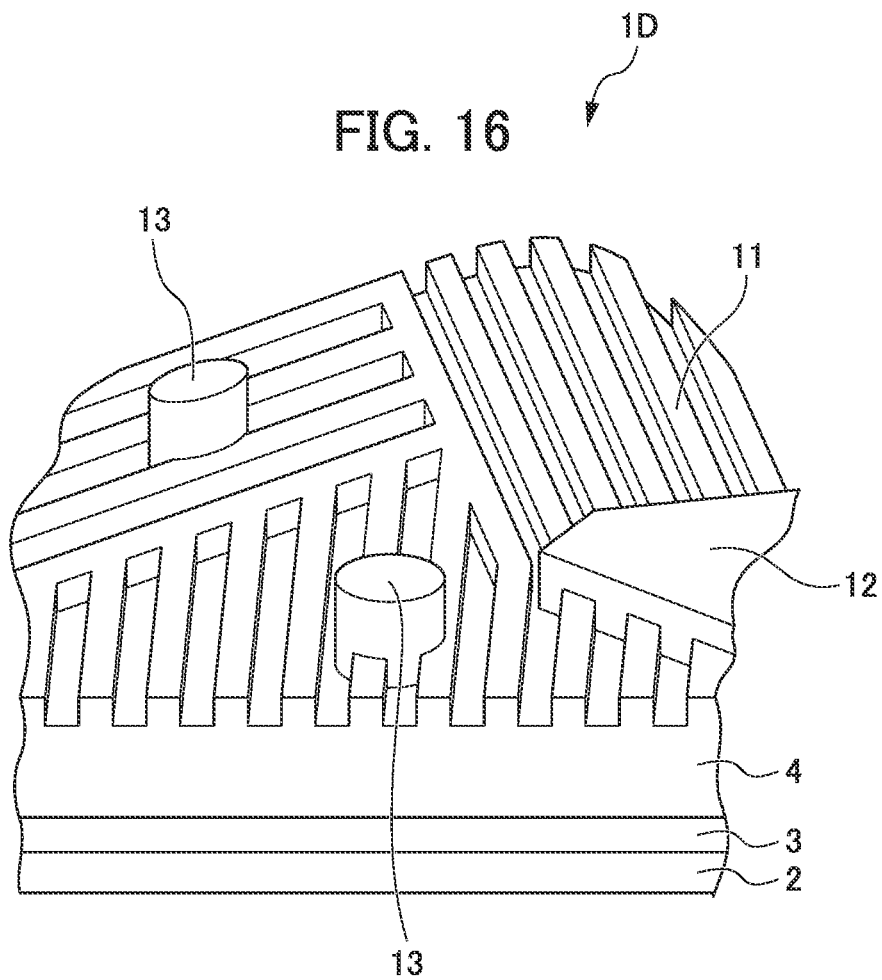
FIG. 16 is a perspective view showing, in an enlarged manner, a portion of a decorative sheet 1D according to a fourth embodiment of the present invention.
Figure 17:
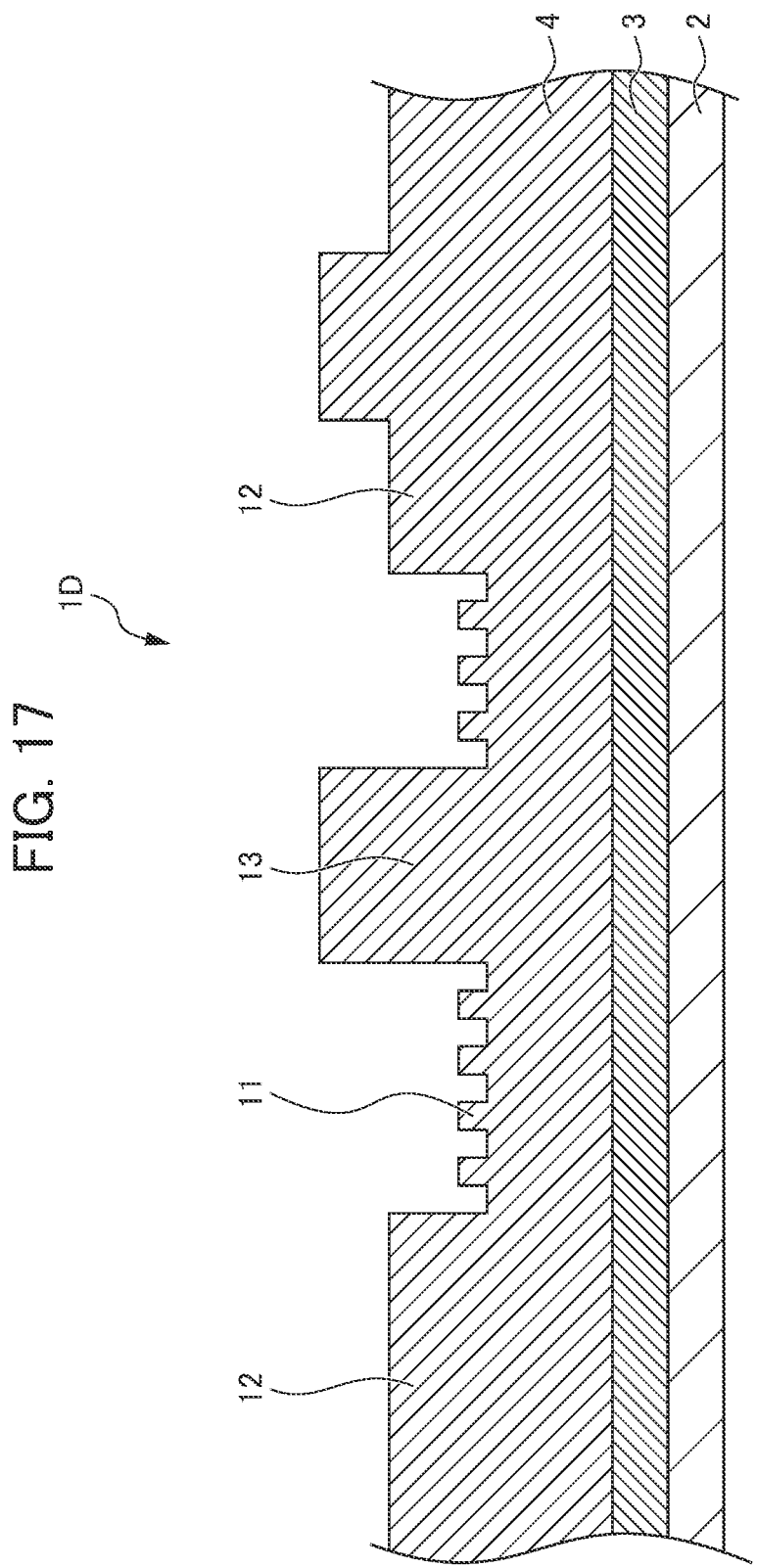
FIG. 17 is a cross-sectional view of the decorative sheet 1D along a cutting plane perpendicular to the sheet surface.

FIG. 16 is a perspective view showing, in an enlarged manner, a portion of a decorative sheet 1D according to a fourth embodiment of the present invention. FIG. 17 is a cross-sectional view of the decorative sheet 1D along a cutting plane perpendicular to the sheet surface. In the first embodiment, the smooth pattern portion 12 has a height equal to the height of the protrusions of the linear recess-and-protrusion pattern portion 11. On the other hand, in the decorative sheet 1D according to the fourth embodiment, the smooth pattern portion 12 has a height greater than the height of the protrusions of the linear recess-and-protrusion pattern portion 11 as in the third embodiment. In the decorative sheet 1D according to the fourth embodiment, the protrusion pattern portions 13 also have a height greater than the height of the smooth pattern portion 12. Even when the decorative sheet is configured in this manner, the protrusion pattern portions 13 are sufficiently effective in reinforcing the linear recess-and-protrusion pattern portion 11.

Modifications

The embodiments described above are not intended to limit the present invention and may be altered or modified in various ways within the scope of the present invention.

(1) Each embodiment shows an example in which the linear recess-and-protrusion pattern portion 11 has grooves arranged in parallel to one another, and the grooves has a plan view pattern showing a group of parallel straight lines. Such features are non-limiting, and alternatively, for example, the grooves may be arranged in a curved line pattern or a combined pattern of straight and curved lines in plan view.

(2) Each embodiment shows an example in which the base material and the print layer are heat laminated with the resin layer. Such a feature is non-limiting, and alternatively, for example, a photocurable resin may be used to form the recess-and-protrusion pattern portion on the base material and the print layer. The multilayer structure may also be modified, for example, by adding another layer, such as a reflective layer, or by omitting the base material or the print layer.

(3) Each embodiment shows an example having the smooth pattern portion 12. Such a feature is non-limiting, and, for example, an alternative embodiment may be provided without the smooth pattern portion 12.

Although not described in detail, any appropriate combination of the first, second, and third embodiments and modifications thereof may be provided. It will be understood that the embodiments described above are not intended to limit the present invention.

(4) Each embodiment shows an example in which the contour shapes of the linear recess-and-protrusion pattern portion 11, the smooth pattern portion 12, and the protrusion pattern portions 13, and the patterned layer 3 reproduce the plan view pattern of various polygonal mineral single crystals arranged in a cross-section of a granite plate. Such a feature is non-limiting, and alternatively, for example, the contour shapes of the linear recess-and-protrusion pattern portion 11, the smooth pattern portion 12, and the protrusion pattern portions 13, and the patterned layer 3 may produce other appearances of plan view patterns, such as those shown below.

(4-1) Patterns of various mineral components in a cross-section of a plate of marble, onyx, travertine, or the like.

(4-2) Wood grain patterns on the surface of an autumn wood portion, a spring wood portion, a light portion, a wood surface portion, or the like of a plate of any wood, such as pine, cedar, or zelkova.

(4-3) Plan view patterns of fabrics or knits of fibers of silk, cotton, or hemp, or various synthetic fibers.

(4-4) Artificially designed patterns, such as various geometrical figures or letters arranged in a plane.

(5) Each embodiment shows an example of a pictorial pattern-printed decorative sheet having a multilayer structure of the resin layer 4 and the base material 2. Such a feature is non-limiting, and alternatively, for example, the sheet may have a monolayer structure without the resin layer 4, which functions as a protective layer, if the pictorial pattern is omitted. Alternatively, the sheet may have a structure of three or more layers. The multilayer structure may be formed with or without an adhesive layer. For example, dry lamination using an adhesive layer may be performed, or heat lamination may be performed with no adhesive layer.

Figure 18:
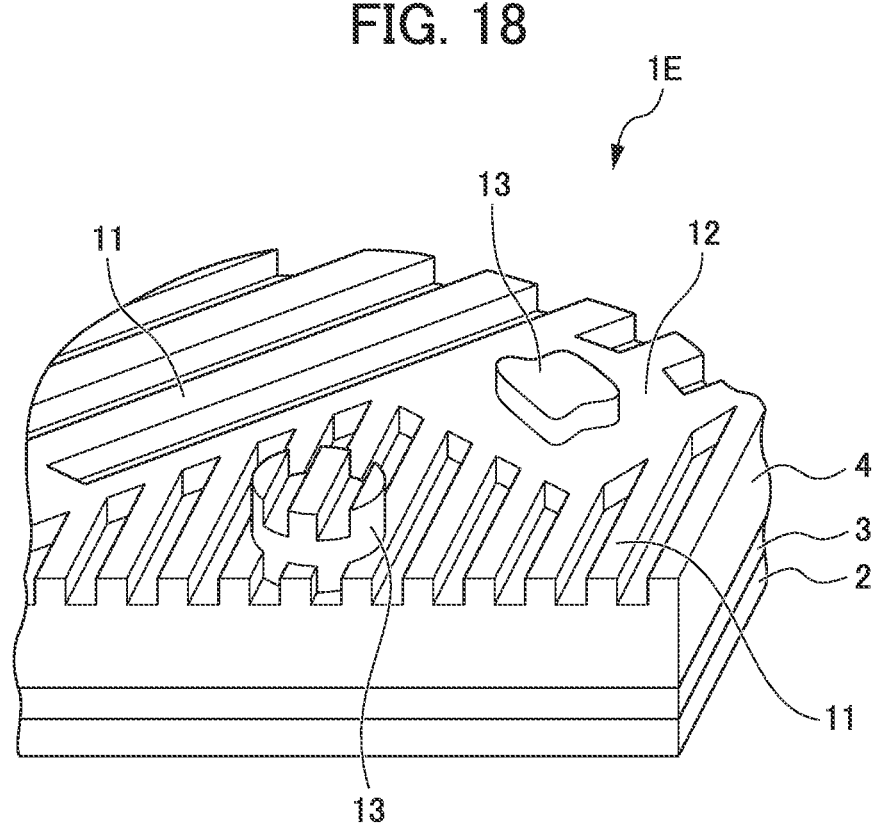
FIG. 18 is a view showing a modified form of the top of protrusion pattern portions 13.

(6) In each embodiment, the protrusion pattern portions 13 have a flat top as shown in the drawings. FIG. 18 is a view showing a modified form of the top of the protrusion pattern portion 13. For example, a decorative sheet 1E shown in FIG. 18 may be provided, in which the top of the protrusion pattern portion 13 is shaped in a recess-and-protrusion pattern corresponding to the linear recess-and-protrusion pattern portion 11. When the structure shown in FIG. 18 is formed, an etching process may be used in the mold forming step so that the mold can be easily formed in some cases.

(7) For easy understanding, each embodiment has been described with reference to the drawing showing that only the resin layer 4 has the recess-and-protrusion pattern. Such a feature is non-limiting, and alternatively, for example, the top and bottom surfaces of the decorative sheet may each have the recess-and-protrusion pattern. FIG. 19 is a view showing an example of a decorative sheet also having the recess-and-protrusion pattern on its bottom side. A decorative sheet 1F shown in FIG. 19 may be provided in which its bottom side (the lower side in FIG. 19) has recesses corresponding to the significantly protruding portions on its top side.

Alternatively, the top and bottom surfaces may each have all recess-and-protrusion patterns.

EXPLANATION OF REFERENCE NUMERALS 1, 1B, 1C, 1D, 1E, 1F: Decorative sheet
2: Base material 3: Patterned layer
4: Resin layer
11: Linear recess-and-protrusion pattern portion
12: Smooth pattern portion
13: Protrusion pattern portion
21: Large diameter roller
22: Heater
23: Mold roller
24: Die roller

The invention claimed is:

1. A decorative sheet comprising:
a plurality of regions each provided with a linear recess-and-protrusion-pattern portion having a plurality of grooves arranged side by side, wherein the linear recess-and-protrusion pattern portion is segmented into closed regions, which include adjacent closed regions different in the form of grooves, wherein one closed region has a first groove extending direction, a first depth, a first protrusion width, and a first groove width, while another closed region adjacent to the one closed region has a second groove extending direction, a second depth, a second protrusion width, and a second groove width, at least one of which differs from that of the one closed region; and
a plurality of dot-shaped protrusion pattern portions that are interspersed in the plurality of regions each provided with the linear recess-and-protrusion pattern portion and the dot-shaped protrusion pattern portions protruding at least to a height greater than that of a protrusion of the linear recess-and-protrusion pattern portion, wherein the dot-shaped protrusion pattern portions are different from each other and all dot-shaped protrusion pattern portions are arranged such that they neither have plan view shapes congruent to one another nor are arranged at regular pitches in a plane in plan view in the direction normal to the surface of the sheet surface.

2. The decorative sheet according to claim 1, wherein the linear recess-and-protrusion pattern portion has grooves arranged at a pitch of 240 µm or less, and the dot-shaped protrusion pattern portions each have an area of 0.02 mm$^2$ or more.

3. The decorative sheet according to claim 1, wherein the linear recess-and-protrusion pattern portion has protrusions with a height of 5 µm or more.

4. The decorative sheet according to claim 1, wherein the dot-shaped protrusion pattern portions each have a height of 20 µm or more.

5. The decorative sheet according to claim 1, wherein the linear recess-and-protrusion pattern portion is segmented into closed regions, and the closed regions include adjacent closed regions different in groove form.

6. The decorative sheet according to claim 1, further comprising
a smooth pattern portion that is further located in the linear recess-and-protrusion pattern portion, has a pattern different from that of the linear recess-and-protrusion pattern portion and that of the dot-shaped protrusion pattern portions, and has a surface devoid of recess and protrusion geometries, wherein
the dot-shaped protrusion pattern portions each have a height equal to or greater than that of the smooth pattern portion.

7. The decorative sheet according to claim 1, comprising:
a base material;
a patterned layer provided on the base material; and
a resin layer provided on the patterned layer, wherein
the linear recess-and-protrusion pattern portion and the protrusion pattern portions are molded in the resin layer.

* * * * *